United States Patent [19]

Austin

[11] 4,372,123
[45] Feb. 8, 1983

[54] THERMAL-GRAVITY ENGINE

[76] Inventor: Kenneth L. Austin, 909 E. Cypress Ave., Lompoc, Calif. 93436

[21] Appl. No.: 298,599

[22] Filed: Sep. 2, 1981

[51] Int. Cl.³ .......................... F03G 7/00; F03B 17/06
[52] U.S. Cl. ........................................ 60/639; 60/640; 60/531; 60/675
[58] Field of Search ................. 60/639, 675, 530, 531, 60/640

[56] References Cited

U.S. PATENT DOCUMENTS

| 1,260,204 | 3/1918 | Keithly | 60/640 |
| 4,195,486 | 4/1980 | Rivera-Cruz | 60/675 |
| 4,209,990 | 7/1980 | Shelton, Jr. | 60/640 |
| 4,246,756 | 1/1981 | West | 60/640 |

Primary Examiner—Allen M. Ostrager
Assistant Examiner—Peggy A. Loiacano
Attorney, Agent, or Firm—Ancel W. Lewis, Jr.

[57] ABSTRACT

A thermal-gravity engine is driven by a changing of the temperature of a vaporizable working fluid (55) in a closed-loop fluid system and the force of gravity operates on a reciprocating lever (12). One or more weight chambers (21), a storage chamber (24), and flow lines (25 and 26) therebetween are arranged in a closed-loop fluid flow system through which the working fluid is pumped. A temperature differential is produced between the two chambers to pump liquid from the storage chamber into each weight chamber in an up position to increase the weight of the weight chamber on an end of the reciprocating lever to move it down in response to the increased weight. The storage chamber is located below each weight chamber. A valve (28) in one flow line for each weight chamber operates to equalize the pressure in an upper portion of each weight chamber and the storage chamber when the weight chamber is in the down position and, when opened, the working fluid drains by gravity from each weight chamber back to the storage chamber to unload each weight chamber. Then the associated counterweight (18) moves each operating end back to the up position and the cycle is repeated to continuously oscillate the lever up and down. The oscillating motion of each lever is connected by a ratchet assembly to rotary motion and a flywheel is used to store the energy.

10 Claims, 5 Drawing Figures

THERMAL-GRAVITY ENGINE

TECHNICAL FIELD

This invention relates generally to motive power apparatus and more particularly to a novel heat engine having a reciprocating lever that is actuated by changing the state of a vaporizable fluid and by the force of gravity.

BACKGROUND ART

In the past water-powered gravity type engines have been provided using a reciprocating lever with buckets on each end, the lever being actuated by alternately loading and unloading the buckets as is shown in U.S. Pat. No. 1,260,204. U.S. Pat. No. 4,209,990 discloses a reciprocating lever with a bucket on one end and a counterweight on the other end, together with a ratchet assembly to change the reciprocating motion of the lever to rotary motion. Additionally, power generation systems have been suggested using the closed-loop fluid system wherein a working liquid is alternately vaporized and condensed to drive a turbine. No known prior art has utilized the combination of a reciprocating lever and closed-loop fluid system in a simple yet highly effective thermal-gravity engine as is described in the present invention.

DISCLOSURE OF INVENTION

In accordance with the present invention a thermal-gravity engine disclosed herein includes at least one lever and weight and storage chambers arranged in a closed-loop fluid system to reciprocate the lever. The weight chamber is alternately filled and drained to load and unload one end of the lever, which has a counterweight on the other end. The loaded weight chamber causes the lever to move down and the unloading of the weight chamber by the passage of the working fluid back to the storage chamber by gravity flow causes the lever to move up in a reciprocating motion for the lever which is converted to rotary movement in an output shaft by means of a ratchet assembly.

BRIEF DESCRIPTION OF DRAWINGS

The details of this invention will be described in connection with the accompanying drawings, in which.

DETAILED DESCRIPTION

Figure 1:
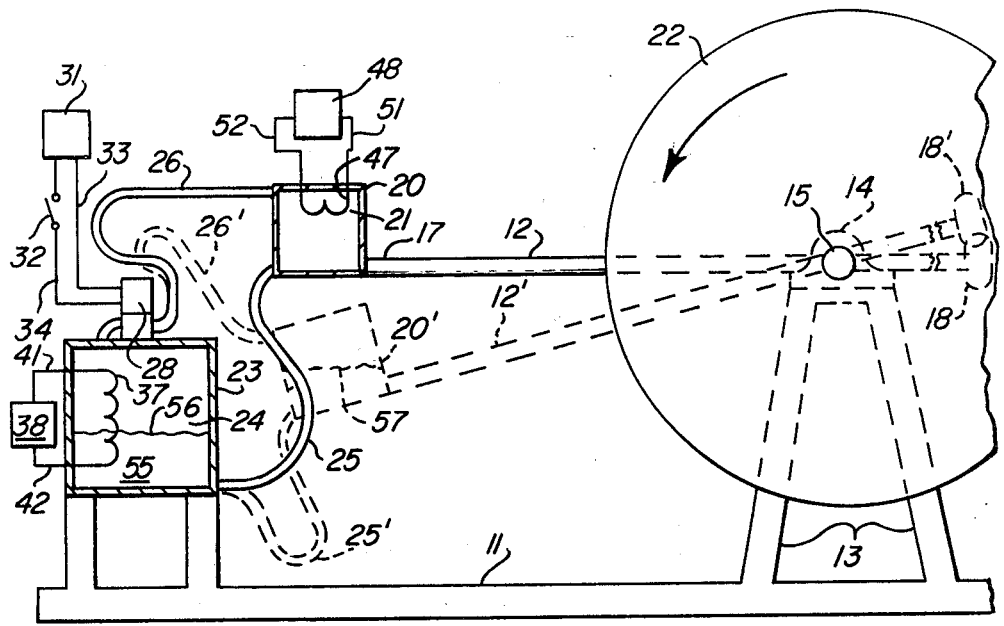
FIG. 1 is a side elevation view of a heat engine embodying features of the present invention with the up position for the lever shown in full lines and the down position shown in dashed lines.
Figure 2:
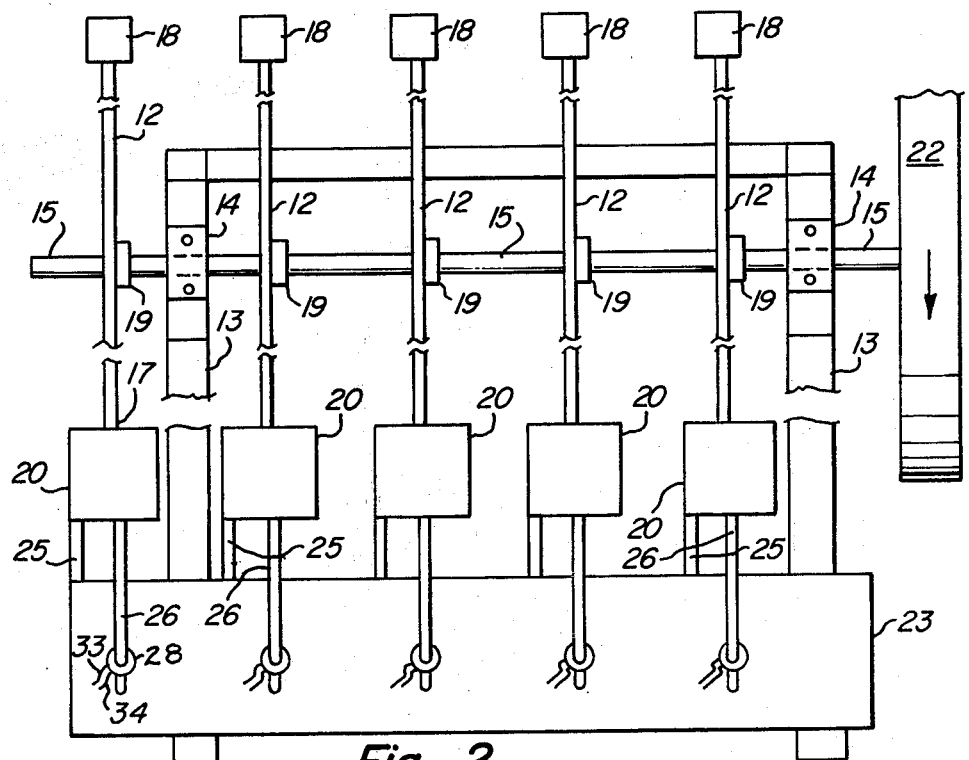
FIG. 2 is a top plan view of the heat engine having a plurality of lever and weight chamber assemblies associated with a common shaft.

Referring now to the drawings, the thermal-gravity engine shown includes rectangular base 11 on which there are supported in raised positions a plurality of parallel spaced levers 12 by means of opposed uprights 13, a pair of bearings 14, and a common axle or output shaft 15 that is along an axis which forms an intermediate pivot for the up and down reciprocating movement of the levers. The bearings 14 are of the pillow-block type. Each lever has an end 17 which carries a weight chamber and has a counterweight 18 on the opposite end. A ratchet assembly 19 is coupled between each lever and the output shaft 15 to convert from reciprocating motion to unidirectional rotary motion in one direction. A flywheel 22 is shown on the end of the output shaft as a preferred means to store the energy which is produced by the engine. While a plurality of the levers are shown, it is understood that in its simplest form the engine would operate with only a single lever.

Each of the levers 12 is caused to reciprocate by the alternately unloading and loading end 17 thereof. For this purpose there is provided an oblong canister 20 defining an enclosed space or chamber 21, herein referred to as a weight chamber. A container 23 defines an enclosed space or chamber 24 for containing a working fluid 55. Freon is a suitable substance for the working fluid. Chamber 24 is herein referred to as the storage chamber.

Container 23 is mounted on the base 11 at a location below the weight chambers 21 when they are in both the up position and the down position to facilitate the drainage of fluid from weight chamber 21 to storage chamber 24. Each weight chamber 21 has a lower flow line 25 coupled in flow communication with a lower portion of each weight chamber 21 and the storage chamber 24 and an upper flow line 26 coupled in flow communication with an upper portion of each weight chamber and the storage chambers so as to form with each weight chamber and the storage chamber a closed fluid flow system.

A normally closed on-off electric solenoid gas flow control valve 28 is used to normally block fluid flow through the upper flow line 26 and this valve is opened when the lever is in the down position. Valve 28 shown is powered by an electric circuit, shown as an electric power source 31 and an on-off electric switch 32 and power lines 33 and 34.

A means for heating the storage chamber is shown as provided by a fluid-carrying coil 37 located within the storage chamber 24 which has a source of heat 38 coupled to the coil 37 by a pair of flow lines 41 and 42. Similarly, each weight chamber has a means for cooling provided by a fluid-carrying coil 47 in the chamber coupled to a source of cooling 48 by a pair of flow lines 51 and 52. The combination of heating of the working fluid represented at 55 in the storage chamber and the cooling of the weight chamber 21 produces an internal pressure differential between the two chambers in the upper portions thereof which causes the working fluid to be pushed up from the storage chamber and into each weight chamber. It is understood that in its simplest form either cooling or heating could be used to produce the internal pressure differential.

The sequence of operation for the above described engine is as follows: With the weight chambers 21 up and unloaded, the fluid is at a maximum level indicated at 56. Upon the simultaneous heating and cooling of the storage and weight chambers, respectively, there is produced an internal differential pressure within and between the storage and weight chambers which causes the working fluid to be pushed from the storage chamber into each of the weight chambers through the lower flow line 25 until the weight chambers are sufficiently heavy in relation to the counterweight 18 to cause the operating ends of the levers to fall down to the down position under the force of gravity in a downstroke as represented in dashed lines with the fluid level in the weight chamber indicated by line 57.

More specifically, if hot water is pumped through the heating coil, the working fluid is boiled to increase the gas pressure in the upper portion of the storage chamber. In turn, if cold water is pumped through the cooling coil there is a condensation of vapor in the upper portion of the weight chamber to lower the pressure therein.

When the lever is in the down position, the associated valve is then opened by actuating the associated switch 32 to provide an equalizing pressure in the upper portions of the associated weight chamber and storage chamber through the respective upper flow line 26, together with a drainage of the working fluid from the weight chamber through the lower flow line back into the storage chamber, so that the weight of the weight member is now reduced sufficiently so that each lever moves to the up position in an upstroke due to the forces of gravity acting on the counterweight. The down positions are indicated by reference numerals 12', 18', 20', 25', and 26' for the respective parts.

This procedure is repeated, causing the levers to reciprocate up and down continuously. The reciprocating motion of the levers is transmitted to the output shaft 15 by the ratchet assemblies 19, causing the output shaft to rotate, and this energy is transmitted to the flywheel 22.

Figure 3:
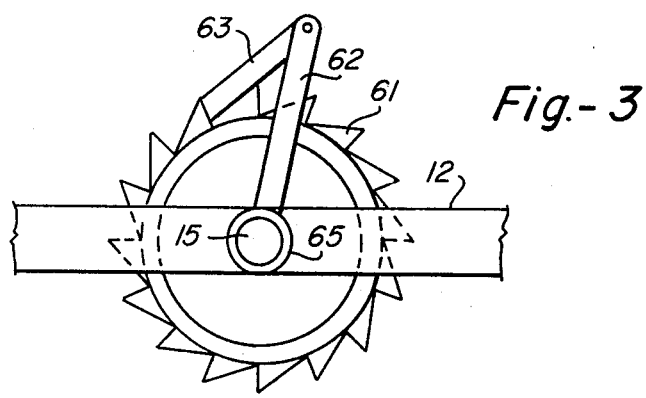
FIG. 3 is a side elevation view of a ratchet assembly for converting the reciprocating motion of the lever to rotary motion in an output shaft.
Figure 4:
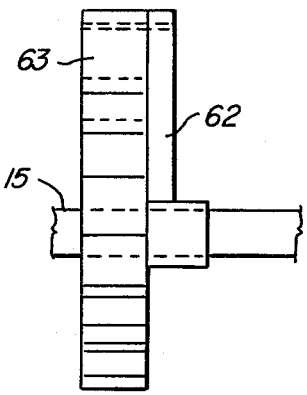
FIG. 4 is an end elevation view of the ratchet assembly shown in FIG. 3.
Figure 5:
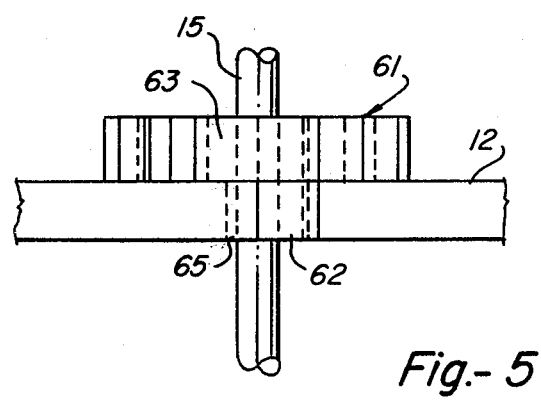
FIG. 5 is a top plan view of the ratchet assembly shown in FIG. 3.

Referring now to FIGS. 3–5, the ratchet assembly is shown to comprise a ratchet wheel 61 having a pawl support lever 62 and a driving pawl 63 associated therewith, together with the lever 12, the output shaft 15, and a bushing 65. The ratchet wheel 61 is attached to the output shaft 15 but the ratchet wheel 61 does not rotate on the output shaft 15. The lever 12 carries the bushing 65 through which the output shaft 15 passes and the bushing allows the output shaft to rotate inside so that, as the lever moves up and down, the driving pawl 63 and lever 62 move against the teeth on the ratchet wheel 61 and rotate the output shaft 15.

Although the present invention has been described with a certain degree of particularity, it is understood that the present disclosure has been made by way of example and that changes in details of structure may be made without departing from the spirit thereof.

What is claimed is:

1. A thermal-gravity engine comprising:
    at least one lever arranged to reciprocate between up and down positions about a pivot for actuating an output shaft;
    fluid loading and unloading means including a weight chamber on one end of said lever that is normally held in an up position by a counterweight on said lever opposite said weight chamber and a storage chamber disposed below said weight chamber, a first flow line coupled in flow communication with lower portions of said chambers, and a second flow line coupled in flow communication with the upper portions of said chambers to form a closed, fluid-flow system which contains a working fluid;
    thermal input means associated with at least one of said chambers to change the temperature in said one chamber to produce an internal pressure differential between the upper portions of said chambers; and
    blocking means for said upper flow line to normally block fluid flow through said upper flow line and arranged to allow fluid flow when said lever is moved to the down position,
    whereby, with the weight chamber up and upon the production of said internal pressure differential, the working fluid is pumped from said storage chamber into said weight chamber via said first flow line until the weight thereof is sufficient in relation to said counterweight to cause said one end of the lever to move to the down position under the force of gravity in a downstroke to apply a torque to said output shaft, the second flow line then being opened to provide an equalizing of the pressures in the upper portion of said chambers to allow the drainage of the working fluid from said weight chamber via said first flow line back into the storage chamber so that the weight of the weight chamber is reduced sufficiently to cause the lever to move up in an upstroke due to the force of gravity acting on said counterweight.

2. A thermal-gravity engine as set forth in claim 1 including a plurality of levers mounted on a common shaft and a flywheel on said shaft to store the energy.

3. A thermal-gravity engine as set forth in claim 1 including a ratchet-type mechanism between each lever and said common shaft to convert up and down movement of said levers to unidirectional rotary movement in said common shaft.

4. A thermal-gravity engine as set forth in claim 1 wherein said working fluid is a vaporizable liquid such as Freon.

5. A thermal-gravity engine as set forth in claim 1 wherein said blocking means is in the form of an electric gas valve having an electric solenoid which in turn controls a fluid flow passage thereof.

6. A thermal-gravity engine as set forth in claim 1 wherein said thermal input means includes a heating coil associated with said storage chamber to apply heat to a working liquid in said storage chamber and heating means for circulating a heated liquid through said heating coil.

7. A thermal-gravity engine as set forth in claim 1 wherein said thermal input means includes a cooling coil associated with said weight chamber to cool a working liquid in said weight chamber to condense the vapor in an upper portion thereof and cooling means for circulating a cooled liquid through said cooling coil.

8. A thermal-gravity engine as set forth in claim 7 wherein said heating and cooling of said chambers is carried out simultaneously.

9. A thermal-gravity engine comprising:
    at least one lever arranged to pivot between up and down positions about an intermediate pivot and arranged to rotate an output shaft;
    temperature responsive fluid loading and unloading means including a weight chamber on one end of said lever that is normally held in an up position by a counterweight on said lever opposite said weight chamber, a storage chamber confining a working fluid in a lower portion disposed below said weight chamber, a lower flow line coupled in flow communication with lower portions of said chamber, and an upper flow line coupled in flow communication with the upper portions of said chambers to form a closed fluid flow system;

means for heating said storage chamber to boil the working fluid to increase the pressure in an upper portion thereof;

means for cooling said weight chamber to condense a vapor in an upper portion thereof; and a valve in said upper flow line normally closed to block fluid flow through said upper flow line and opened when said lever is in the down position, whereby, with the weight chamber up and upon the heating and cooling of said chambers, an internal pressure differential is produced between said chambers so that the working fluid is pushed from said storage chamber into said weight chamber via said lower flow line until the weight thereof is sufficient in relation to said counterweight to cause said operating end of the lever to fall to the down position under the force of gravity in a downstroke, the valve is opened to provide an equalizing of the pressure in the upper portions of said chambers via said upper line, and the working fluid drains from said weight chamber via said lower line back into said storage chamber so that the weight of the weight chamber is reduced sufficiently to cause the lever to move up in an upstroke due to the force of gravity acting on said counterweight.

10. A thermal-gravity engine comprising:

a base;

a plurality of parallel spaced levers arranged to pivot on a common shaft above said base between up and down positions about an intermediate pivot;

an output shaft;

a ratchet mechanism between each lever and said common shaft to transmit up and down motion of the lever to unidirectional rotary motion;

a canister forming a weight chamber on one end of each lever normally held in an up position by a counterweight opposite said weight chamber, a storage container defining a chamber disposed below said weight chambers at all times, a lower flow line coupled in flow communication with lower portions of each weight chamber and said storage chamber, and an upper flow line coupled in flow communication with the upper portion of each weight chamber and said storage chamber to form a closed-loop fluid flow system which contains a working fluid;

heating means for supplying heat to said storage chamber;

cooling means for cooling said weight chambers; and a gas flow control valve in said upper flow line normally closed to block fluid flow through said upper flow line and opened when said lever is in the down position, whereby, with the weight chambers up and upon the production of an internal pressure differential between said chambers by said heating and cooling means, the working fluid is pumped from said storage chamber into said weight chambers via said lower flow lines until the weight of each weight chamber is sufficient in relation to the associated counterweight to cause said one end of each lever to move to the down position under the force of gravity in a downstroke to apply torque to said output shaft, the valve is opened to provide an equalizing of the pressure in the top portions of said weight and said storage chambers via said upper flow line, and the working liquid drains from said weight chamber via each lower line back into the storage chamber so that the weight of each weight chamber is reduced sufficiently to cause the associated lever to move up in an upstroke due to the force of gravity acting on said counterweight.

* * * * *